United States Patent
Silis

(10) Patent No.: US 8,300,100 B2
(45) Date of Patent: Oct. 30, 2012

(54) VIDEO SURVEILLANCE RECORDING SYSTEM

(76) Inventor: John P. Silis, Melbourne, FL (US)

( * ) Notice: Subject to any disclaimer, the term of this patent is extended or adjusted under 35 U.S.C. 154(b) by 310 days.

(21) Appl. No.: 12/708,504

(22) Filed: Feb. 18, 2010

(65) Prior Publication Data

US 2011/0199481 A1    Aug. 18, 2011

(51) Int. Cl.
*H04N 7/18* (2006.01)
(52) U.S. Cl. .................................. 348/143; 348/151
(58) Field of Classification Search .............. 348/143, 348/151

See application file for complete search history.

(56) References Cited

U.S. PATENT DOCUMENTS

| | | | |
|---|---|---|---|
| 6,061,087 A * | 5/2000 | Schieltz et al. | 348/151 |
| 7,011,460 B1 | 3/2006 | Todd | |
| 7,828,486 B1 * | 11/2010 | Wong | 396/427 |
| 2003/0146974 A1 | 8/2003 | Murphy | |
| 2005/0232624 A1 | 10/2005 | Baldwin | |
| 2010/0139290 A1 * | 6/2010 | Leblond | 62/3.3 |

* cited by examiner

*Primary Examiner* — John Follansbee
*Assistant Examiner* — Glenford Madamba

(57) ABSTRACT

Embodiments of the present invention may provide a system and method for providing airflow through a video surveillance system enclosure. A video surveillance system enclosure may have a first hole and a second hole. An incoming conduit may have a first incoming opening fitted into the first hole. A first plurality of holes may along at least a portion of a length of the incoming conduit. An outgoing conduit may have a first outgoing opening fitted into the second hole. A second plurality of holes may run along at least a portion of a length of the outgoing conduit.

10 Claims, 3 Drawing Sheets

VIDEO SURVEILLANCE RECORDING SYSTEM

BACKGROUND OF THE INVENTION

The present invention generally relates to a video surveillance recording system, and more specifically relates to a weather-proof and vandal resistant video surveillance recording system that may be used outdoors and that may communicate wirelessly to capture and playback surveillance video.

Currently, most video surveillance recording systems are designed to be used indoors, where these systems may not be exposed to extreme temperatures or the elements. However, there may be situations where it is desirable or necessary to place video surveillance recording systems outdoors, such as when there is no place to house video surveillance recording systems indoors. When these video surveillance recording systems are used outdoors and exposed to the elements, the systems may not be able to operate efficiently. However, if a video surveillance system is sealed in an air-tight enclosure in order to protect the system from the elements outdoors, it may not be able to normally operate and may overheat.

As can be seen, there is a need for a video surveillance recording system that may be sufficiently protected from the elements, in order to be used outdoors.

SUMMARY OF THE INVENTION

In one aspect of the present invention, a system may comprise an enclosure having a first hole and a second hole; an incoming conduit having a first incoming opening fitted into the first hole; a first plurality of holes running along at least a portion of a length of the incoming conduit; an outgoing conduit having a first outgoing opening fitted into the second hole; and a second plurality of holes running along at least a portion of a length of the outgoing conduit.

In another aspect of the present invention, a method for providing airflow within an enclosure may comprise receiving air into a first plurality of holes running along at least a portion of a length of an incoming conduit; circulating the air within the enclosure attached to the incoming conduit at a first opening of the enclosure via a first fan situated near the first opening, thereby cooling a computer component within the enclosure; circulating the air out of the enclosure and into an outgoing conduit at a second opening of the enclosure via a second fan situated at the second opening after the air has cooled the computer component; and expelling the air from the outgoing conduit via a second plurality of holes running along at least a portion of a length of the outgoing conduit.

These and other features, aspects and advantages of the present invention will become better understood with reference to the following drawings, description and claims.

DETAILED DESCRIPTION OF THE INVENTION

Figure 1:
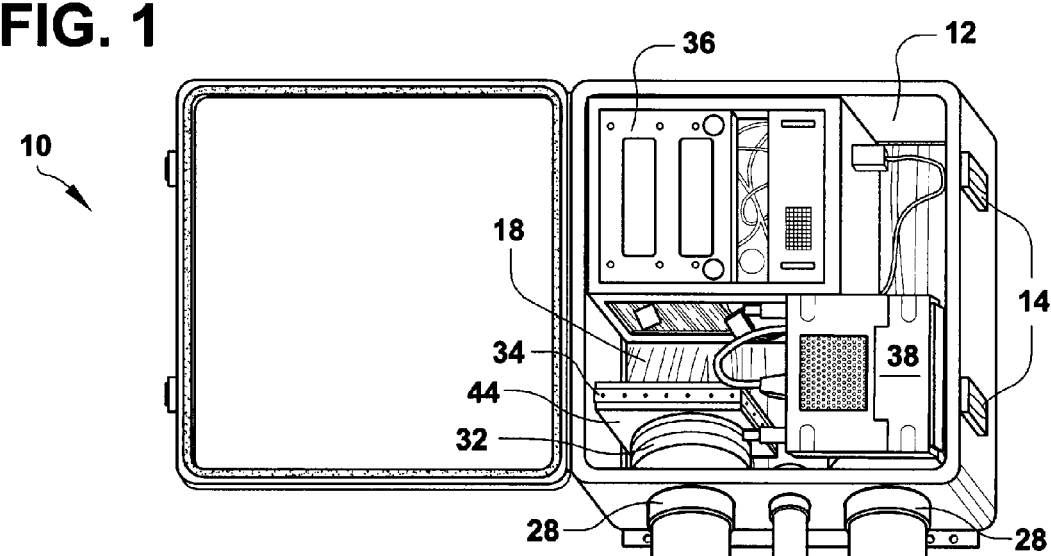
FIG. 1 shows a perspective view of a video surveillance recording system in accordance with an embodiment of the present invention with the door of the weather proof cabinet opened.
Figure 2:
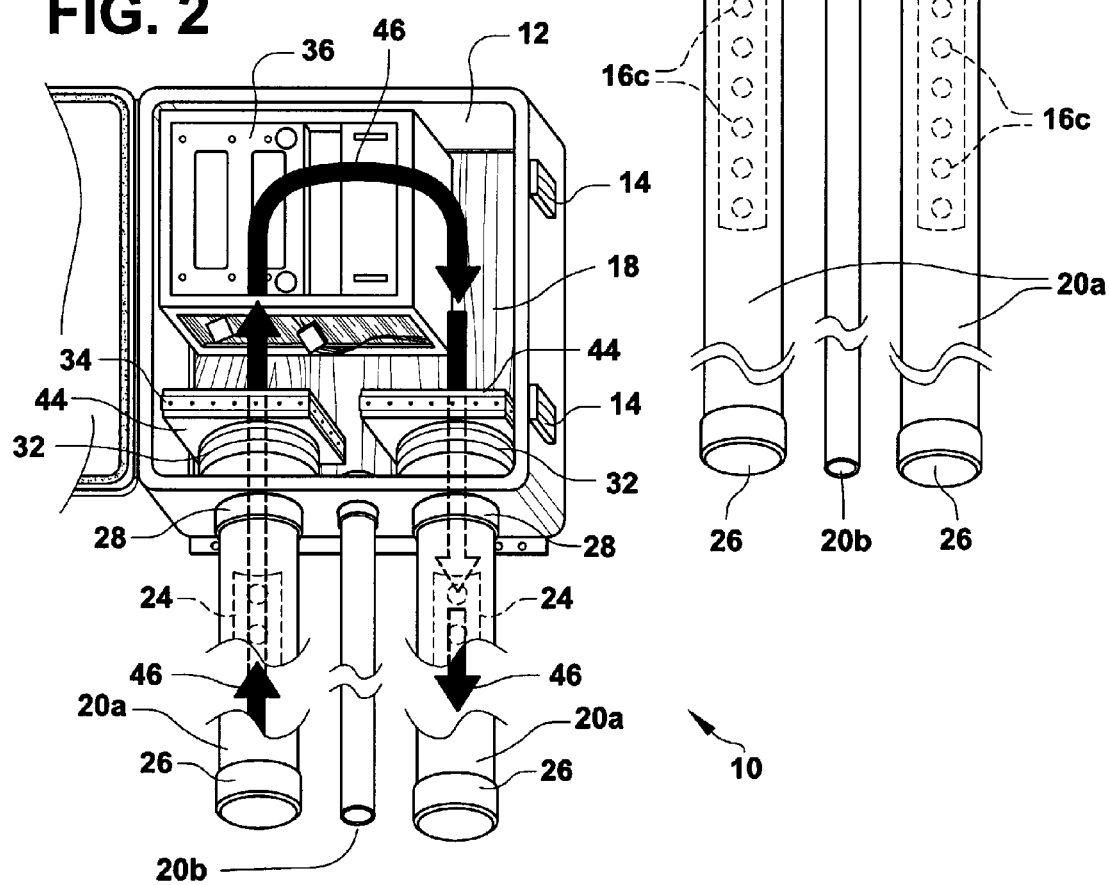
FIG. 2 is perspective view of the video surveillance recording system of FIG. 1 showing the airflow direction inside the secretly-ventilated cabinet forced cool outside air drawn in by a fan into cabinet while another fan expels the hot air to the outside of the cabinet.
Figure 3:
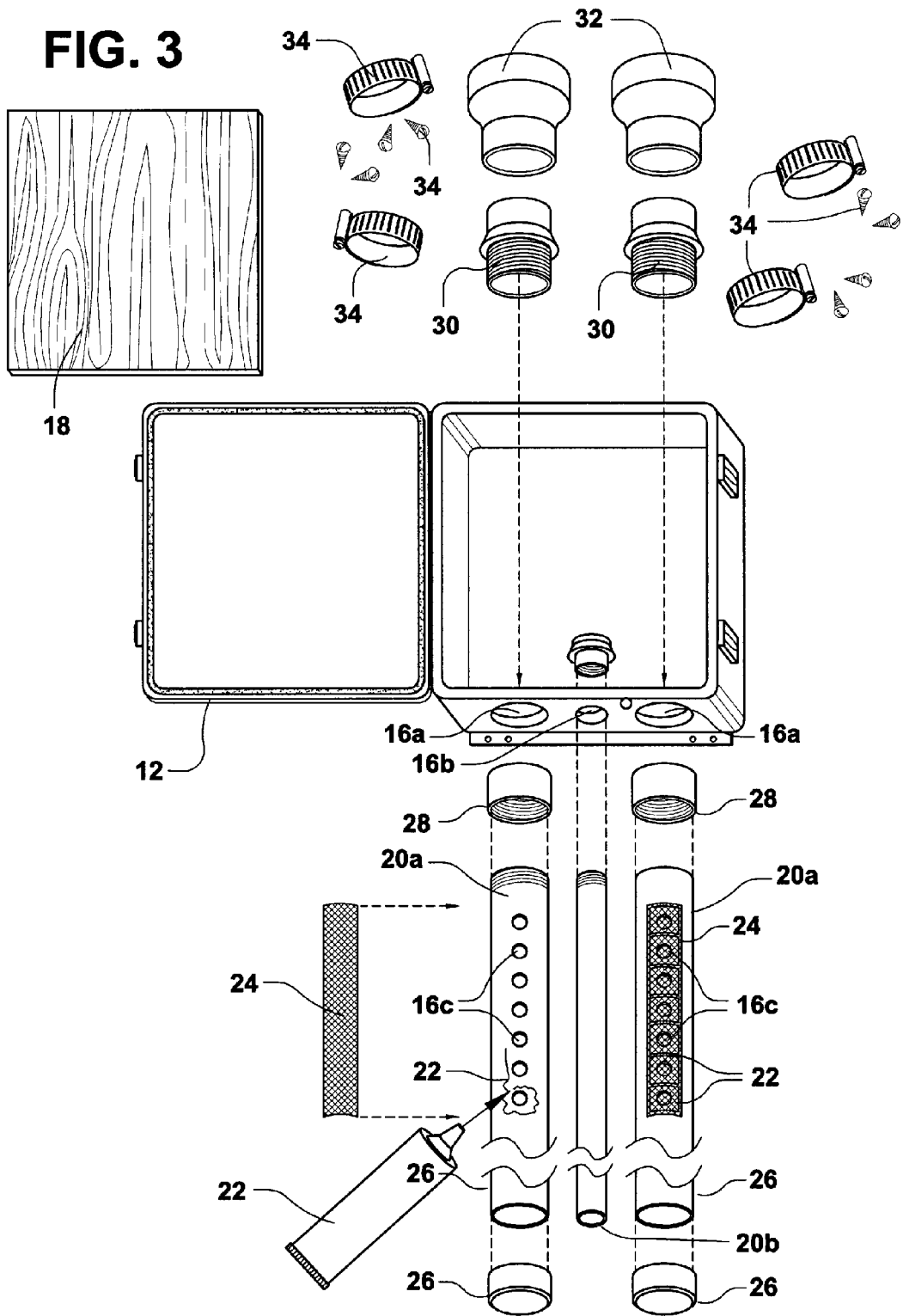
FIG. 3 is an exploded top elevation view of the structural components of the video surveillance system of FIG. 1.
Figure 4:
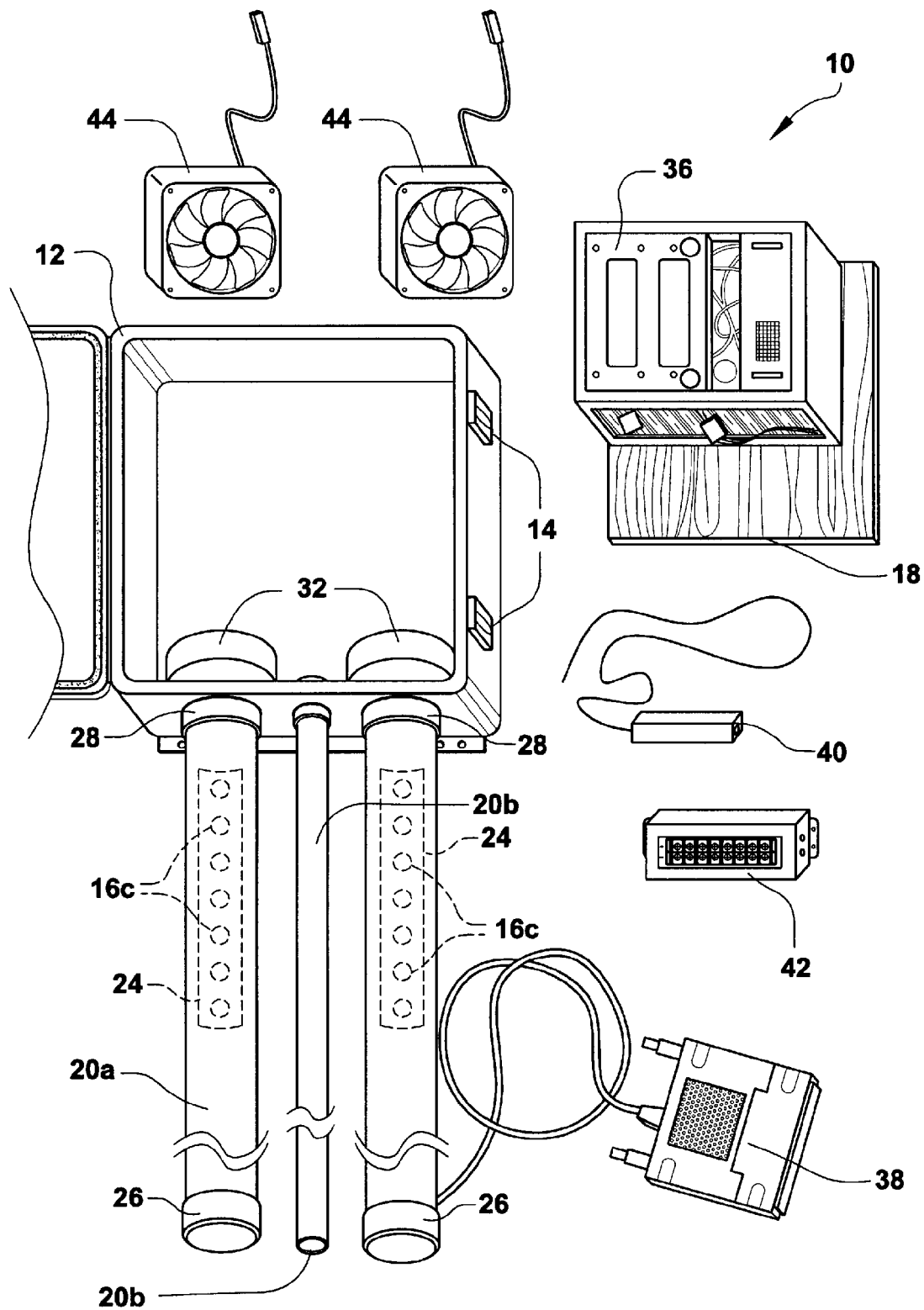
FIG. 4 is an exploded top elevation view of the working components of the video surveillance system of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a weather-proof and vandal resistant video surveillance recording system that may be used outdoors. Because the video surveillance recording system may be weather-proof and vandal resistant, the video surveillance recording system may be used outdoors, thereby eliminating the need for an office-type enclosure that houses a typical video surveillance recording system. To cool the video surveillance system, conduits may feed air into the system via a series of holes drilled into the conduits while fans may circulate that air within the system, thereby allowing the system to stay cool enough that it may be used in all temperature extremes.

Further, because the video surveillance recording system may communicate wirelessly with users and surveillance cameras, the video surveillance system may both capture and playback surveillance video without the need to physically access the system.

In accordance with an embodiment of the present invention, a video surveillance recording system 10 may comprise an enclosure 12 that houses a computer chassis 36 that controls surveillance cameras (not shown). The enclosure 12 may, for example, be a standard large fiberglass and weather-proof electrical cabinet enclosure or case approximately fourteen inches wide, fourteen inches high, and eight inches deep, or any other appropriate weatherproof enclosure, that may be opened via latches 14. For security, the enclosure 12 may be secured via a padlock or any other measures in order to ensure that unauthorized persons are unable to access the interior of the enclosure 12. For added cooling, the enclosure may also be painted with a ceramic thermal-reflective material to prevent sunlight from being absorbed by the enclosure 12, thereby preventing additional heat from being introduced to the enclosure 12. The enclosure 12 may also contain the computer chassis 36 and a wireless router 38. The computer chasses 36 and the wireless router 38 may be mounted via mounting accessories 34 onto a sheet 18 secured to the interior of the enclosure 12. The sheet 18 may be a 0.25-inch thick plywood sheet that is used as a mounting plate for all components within the enclosure 12, thus preventing any screw-related holes from compromising the waterproof characteristics of the enclosure 12.

The computer chassis 36 may be powered by a power cube 40 a power distributor 42. The computer chassis 36 may also comprise an industry-standard personal computer powered by an INTEL™ microprocessor. A LINUX™ operating system may be installed on the personal computer because such an operating system may be operable without a hard drive, but any other appropriate computer operating systems may also be used. The computer chassis 36 may communicate via the wireless router 38 with multiple video cameras in order to capture and process video coming from the video cameras. Because the computer chassis 36 may also communicate over the Internet via the wireless router 38, an administrator may be able to view surveillance video or configure the computer chassis 36 remotely without physical access to the video surveillance recording system 10. The computer chassis 36 may optionally comprise a hard drive that is used to store surveillance video captured by the video cameras that communicate with the computer chassis 36.

The two lengths of the first conduit 20a may fit into two circulation holes 16a on the enclosure in order to promote airflow 46 within the enclosure 12. Each of the two lengths of the first conduit 20a may be a polyvinyl chloride (PVC) tube approximately 4 inches in diameter and 4 feet in length, and may have a plurality of holes 16c, approximately ¾-inch in diameter, drilled along approximately two feet of the length of the two lengths of the first conduit 20a. The two lengths of the first conduit 20a may also comprise screening 24, attached with, for example, an adhesive 22, on the two lengths of the first conduit 20a. The screening 24 may cover the plurality of holes 16c, thereby preventing foreign objects such as dust or pests from entering the plurality of holes 16c while still allowing air to flow into and out of the plurality of holes 16c. The two lengths of the first conduit 20a may then be capped by pipe caps 26 to ensure that only air may enter the two lengths of the first conduit 20a through the plurality of holes 16c.

To securely connect the two lengths of the first conduit 20a with the enclosure 12, tightening collars 28 may be attached to the two lengths of the first conduit 20a, thereby allowing the two lengths of the first conduit 20a to be securely inserted through the two circulation holes 16a, thereby ensuring that there are no gaps between the two circulation holes 16a and the two lengths of the first conduit 20a. The tightening collars 28 may further be attached to unions 30 to further securely attach the two lengths of the first conduit 20a to the enclosure 12.

Plumbing pipe adaptors 32 may be attached to the unions 30 within the interior of the enclosure 32. The plumbing pipe adaptors 32 may be a 4-inch to 6-inch adaptor that may promote airflow 46 within the enclosure 12 using its increased 6-inch diameter. Fans 44, which may be standard 120-millimeter computer box fans, may be attached to the plumbing pipe adaptors 32 and may circulate airflow 46, including cool air flowing into the enclosure 12 through the plurality of holes 16c from one of the two lengths of the first conduit 20a to cool the components within the enclosure 12. Hot air may be expelled out of the enclosure 12 through the plurality of holes 16c from the other of the two lengths of the first conduit 20a.

A second conduit 20b may be attached to the enclosure 12 through a wiring hole 16b in order to carry any necessary wiring for the computer chassis 36, the wireless router 38, or any other components within the enclosure 12. The length of the second conduit 20b maybe a length of PVC piping approximately 2-inches in diameter while the wiring hole 16b may be a hole approximately 2-inches in diameter that is drilled into or otherwise cut out of the enclosure 12.

In use, the video surveillance recording system 10 may be mounted on an outdoor wall or pole. The system 10 may be mounted in such a way so that the plurality of holes 16c faces the wall with an approximate gap of a half inch between the two lengths of the first conduit 20a and the wall. By mounting the system 10 closely to the wall, foreign material such as water may be prevented from entering the plurality of holes 16c while the plurality of holes 16c may be disguised, thereby enabling the two lengths of the first conduit 20a to appear as generic pipes and helping to disguise the system 10 so that unauthorized users may not recognize that the system is indeed a video surveillance recording system 10. To further disguise the system 10, the two lengths of the first conduit 20a and the second conduit 20b may extend all the way into the ground, thereby further disguising the conduits 20a and 20b as regular piping that normally carries water, wires, or another common medium.

The system 10 may communicate with one or more surveillance cameras placed outside of the system 10 in order to receive and store video captured by the surveillance cameras. The computer chassis 36 within the system 10 may comprise a digital video recorder (DVR) for recording and playing back surveillance video captured by the surveillance cameras. In an exemplary embodiment, the system may communicate with four or more surveillance cameras. An authorized user may also communicate wirelessly with the system 10 to view captured surveillance footage or to control the surveillance cameras, such as changing the field of view of the surveillance cameras.

The system 10 and the computer chassis 36 within the system 10 may also be able to connect to the Internet via CAT-5 cables using an on-board Ethernet connector in the computer chassis 36 via a cable modem. The cable modem may be used in lieu of the wireless router 38 or in conjunction with the wireless router 38 in order to connect to the Internet. The computer chassis 36 within the system 10 may be connected to via the Internet, such as by entering the IP address of the computer chassis into a web browser in order to communicate with the computer chassis 36 remotely over the Internet, or via a wireless laptop computer in range of the wireless router 38 that may directly communicate with the wireless router 38 in a local network arrangement even when the computer chassis 36 is not accessible over the internet, such as when the internet connection to the computer chassis 36 is out of operation. The wireless router 38 may be configured to operate in a non-broadcasting mode, so that the computer chassis 38 may not be visible to casual wireless listeners.

It should be understood, of course, that the foregoing relates to exemplary embodiments of the invention and that modifications may be made without departing from the spirit and scope of the invention as set forth in the following claims.

I claim:
1. A system comprising:
an enclosure having a first hole and a second hole;
an incoming conduit having a first incoming opening fitted into the first hole;
a first plurality of holes running along at least a portion of a length of the incoming conduit;
an outgoing conduit having a first outgoing opening fitted into the second hole; and
a second plurality of holes running along at least a portion of a length of the outgoing conduit, wherein the incoming conduit and the outgoing conduit are parallel to one another, wherein the first plurality of holes and the second plurality of holes are covered by screenings, wherein the incoming conduit has a second incoming opening capped by a first pipe cap and the outgoing conduit has a second outgoing opening capped by a second pipe cap.
2. The system of claim 1, further comprising:
a computer component situated within the enclosure;
a first fan situated near the first hole operable to draw air from the incoming conduit and circulate the air within the enclosure; and
a second fan situated near the second hole operable to draw the air from the enclosure into the outgoing conduit and to expel the air from the enclosure through the second plurality of holes.

3. The system of claim 1, wherein:
the first plurality of holes are operable to receive air into the incoming conduit; and
the second plurality of holes are operable to expel the air from the outgoing conduit.

4. The system of claim 1, further comprising:
a wireless router that communicates with the computer component.

5. The system of claim 4, wherein:
the computer component is operable to wirelessly communicate with one or more video surveillance cameras via the wireless router to receive and store surveillance video captured by the one or more surveillance cameras.

6. The system of claim 5, wherein:
the computer component is operable to wirelessly communicate with an external computer to playback the surveillance video on the external computer.

7. The system of claim 1, wherein:
the enclosure is mountable to a wall such that the first plurality of holes and the second plurality of holes face the wall.

8. A method for providing airflow within an enclosure comprising:
receiving air into a first plurality of holes running along at least a portion of a length of an incoming conduit;
circulating the air within the enclosure attached to the incoming conduit at a first opening of the enclosure via a first fan situated near the first opening, thereby cooling a computer component within the enclosure;
circulating the air out of the enclosure and into an outgoing conduit at a second opening of the enclosure via a second fan situated at the second opening after the air has cooled the computer component; and
expelling the air from the outgoing conduit via a second plurality of holes running along at least a portion of a length of the outgoing conduit, wherein the incoming conduit and the outgoing conduit are parallel to one another, wherein the first plurality of holes and the second plurality of holes are covered by screenings, wherein the incoming conduit has a second incoming opening capped by a first pipe cap and the outgoing conduit has a second outgoing opening capped by a second pipe cap.

9. The method of claim 8, further comprising:
wirelessly communicating with one or more video cameras to receive surveillance video from the one or more video cameras and to store the surveillance video onto the computer component.

10. The method of claim 9, further comprising:
wirelessly transmitting the surveillance video from the computer component to an external computer.

\* \* \* \* \*